(12) United States Patent
Wirola et al.

(10) Patent No.: US 10,715,957 B2
(45) Date of Patent: Jul. 14, 2020

(54) IDENTIFYING MOBILE RADIO NODES AND DETERMINING USE OF PUBLIC TRANSPORT VEHICLE

(71) Applicant: HERE GLOBAL B.V., Eindhoven (NL)

(72) Inventors: Lauri Aarne Johannes Wirola, Tampere (FI); Petri Rauhala, Tampere (FI); Marko Luomi, Tampere (FI); Tatiana Vyunova, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 16/173,429

(22) Filed: Oct. 29, 2018

(65) Prior Publication Data

US 2020/0137514 A1 Apr. 30, 2020

(51) Int. Cl.
| | |
|---|---|
| *H04W 4/02* | (2018.01) |
| *G06Q 30/02* | (2012.01) |
| *H04W 8/08* | (2009.01) |
| *H04W 4/40* | (2018.01) |
| *H04W 64/00* | (2009.01) |
| *G06Q 50/30* | (2012.01) |
| *H04W 4/029* | (2018.01) |

(52) U.S. Cl.
CPC ........ *H04W 4/023* (2013.01); *G06Q 30/0261* (2013.01); *G06Q 30/0267* (2013.01); *G06Q 50/30* (2013.01); *H04W 4/027* (2013.01); *H04W 4/029* (2018.02); *H04W 4/40* (2018.02); *H04W 8/08* (2013.01); *H04W 64/003* (2013.01)

(58) Field of Classification Search
CPC ....... H04W 4/023; H04W 4/027; H04W 8/08; H04W 4/40; H04W 64/003; H04W 4/029; G06Q 30/0261; G06Q 30/0267; G06Q 50/30
See application file for complete search history.

(56) References Cited

U.S. PATENT DOCUMENTS

| | | | |
|---|---|---|---|
| 8,738,037 B1 | 5/2014 | Chen et al. | |
| 8,843,158 B2 | 9/2014 | Nagaraj | |
| 9,167,551 B2 | 10/2015 | Gao et al. | |
| 9,400,321 B2 | 7/2016 | Huang et al. | |
| 9,408,178 B2 | 8/2016 | Mayor et al. | |
| 9,853,939 B1 | 12/2017 | Chen et al. | |
| 2013/0217414 A1* | 8/2013 | Nagaraj | H04W 4/029 455/456.2 |

(Continued)

OTHER PUBLICATIONS

Partial European Search Report for Application No. 19205935.0 dated Mar. 13, 2020, 14 pages.

*Primary Examiner* — Minjung Kim
(74) *Attorney, Agent, or Firm* — Alston & Bird LLP

(57) ABSTRACT

Described is a method, performed by at least one apparatus, that includes obtaining a plurality of radio fingerprints, the radio fingerprints including information on radio nodes or signals from radio nodes observed by mobile devices and corresponding location estimates; and identifying, among said radio nodes, those radio nodes which are mobile radio nodes and which belong to a respective public transport vehicle, at least by relating movement information of a respective mobile radio node. The movement information is determined based on said obtained radio fingerprints, with public transport route information.

17 Claims, 5 Drawing Sheets

(56) References Cited

U.S. PATENT DOCUMENTS

| | | | |
|---|---|---|---|
| 2014/0036701 A1* | 2/2014 | Gao | H04W 48/20 |
| | | | 370/252 |
| 2014/0364138 A1* | 12/2014 | Huang | G01S 19/11 |
| | | | 455/456.1 |
| 2015/0073703 A1* | 3/2015 | Jouaux | G01C 21/34 |
| | | | 701/465 |
| 2016/0037404 A1 | 2/2016 | Cai et al. | |
| 2016/0356593 A1* | 12/2016 | Huang | H04W 4/40 |
| 2016/0381205 A1* | 12/2016 | You | H04M 1/72569 |
| | | | 455/418 |
| 2017/0295458 A1 | 10/2017 | Gao et al. | |

* cited by examiner

IDENTIFYING MOBILE RADIO NODES AND DETERMINING USE OF PUBLIC TRANSPORT VEHICLE

FIELD OF THE DISCLOSURE

The invention relates to the field of positioning technologies and specifically its use for advertising technologies. In particular, the invention relates to the identification of mobile radio nodes belonging to a public transport vehicle and to the provision of information, such as advertisements, to a user of a public transport vehicle.

BACKGROUND

The advertisement landscape is experiencing major changes. Whereas today's advertisement can be considered as an area wide broadcasting (e.g. nation-wide newspaper ads or TV commercials), the target for advertisers is to understand both, to whom advertisements are targeted and in which context. The former one, on the one hand, requires understanding consumers and their behavior at ever more granular levels. The latter one, on the other hand, requires understanding where the consumer is, what the consumer is doing and where the consumer is going. Location technologies play a key role in each of these.

While novel positioning technologies are already available, as will be described in the following, they have mainly been developed for navigation purposes. This can render the respective technology only partly useful for other scenarios or use cases, such as for the advertising use case, described above.

Such novel positioning systems and solutions are specifically developed (and if necessary also deployed) mainly for the purpose of navigation. The traditional positioning technologies, which are mainly used outdoors, i.e. satellite and cellular positioning technologies, cannot always deliver the desired performance that would enable seamless and equal positioning experience at all time, particularly indoors or in vehicles. As examples, required positioning accuracy (2-3 m), coverage (~100%) and height detection are challenging to achieve with satisfactory performance levels with the systems and signals that were not designed and specified for every use case in the first place. For instance, in case of indoor or underground situations, satellite-based radio navigation signals simply do not penetrate through the walls and roofs for the adequate signal reception and the cellular signals often have a too narrow bandwidth for accurate ranging by default. But also in certain outdoor scenarios, there may be the case of insufficient coverage of e.g. satellite-based radio navigation, for instance in case of bad weather, in urban street canyons or in tunnels.

Several dedicated solutions have already been developed and commercially deployed during the past years e.g. solutions based on technologies like pseudolites (GPS-like short-range beacons), ultra-sound positioning, Bluetooth or Bluetooth LE signals and WLAN fingerprinting. What is typical to these solutions is that they require either deployment of totally new infrastructure (such as beacons or tags) or manual exhaustive radio-surveying of the streets and buildings including all the floors, spaces and rooms. This is rather expensive and will take a considerable amount of time to build the coverage to the commercially expected level, which can in some cases narrow the potential market segment to only a very thin customer base e.g. for health care or dedicated enterprise solutions. Also, the diversity of these technologies makes it difficult to build a globally scalable indoor positioning solution, and the integration and testing will become complex if a large number of technologies needs to be supported in the consumer devices, such as smartphones.

For a positioning solution to be commercially successful in various use cases and situations it needs to be globally scalable, have low maintenance and deployment costs, and offer acceptable end-user experience. This can best be achieved, if the solution is based on an existing infrastructure in the buildings and on existing capabilities in the consumer devices. Accordingly, such a positioning is preferably based on technologies like Wi-Fi- and/or Bluetooth (BT)-technologies that are already supported in almost every smartphone, tablet, laptop and even in the majority of the feature phones. It is, thus, required to find a solution that uses such cellular or non-cellular radio signals in such a way that makes it possible to achieve 2-3 m horizontal and vertical positioning accuracy with the ability to quickly build the global coverage for this approach.

Modern global cellular (GSM, WCDMA, TD-SCDMA, LTE, LTE-A, CDMA) and non-cellular (primarily WiFi, but also BT, BTLE, Zigbee, etc.) positioning technologies are based on collecting large global databases containing information on the cellular and non-cellular signals emitted from respective radio nodes, the "collecting phase" or "training phase". A large portion of this data typically originates from the users of these positioning technologies, naturally with the end-user consent. It could also be possible to use volunteers to survey the sites in exchange of reward or recognition and get the coverage climbing up globally in the places and venues important for the key customers. While automated crowd-sourcing can enable indoor localization in large amount of buildings, manual data collection using special tools may be the best option, when the highest accuracy is desired.

In any case, the collected data is typically in the form of so called (radio) fingerprints, which contain a location estimate (e.g. GNSS-based or WiFi-based) and the measurement(s) taken from the radio interface(s) (cellular or non-cellular). In case of a cellular positioning technology, such measurements may contain global and/or local identifiers of the cellular network cells observed, signal strength estimates, pathloss estimates and/or timing measurements (such as Timing Advance or Round-Trip Time). In case of a non-cellular positioning technology, such measurements may contain an identifier of the non-cellular radio node (e.g. the BSSIDs, typically the MAC address of the air interface of a respective WiFi access points observed and/or the SSIDs), signal strengths estimates (e.g. received signal strength index, physical Rx level in dBm ref 1 mW, etc.), pathloss estimates and/or timing measurements (e.g. Round-Trip Time).

This data gets uploaded to the server or cloud server, where algorithms are run to generate models of wireless communication nodes for positioning purposes based on the collected fingerprints received from the multitude of the users. Such models may be coverage areas, node positions, radio propagation models, Rx fields, etc. In the end, these models are transferred back to the user terminals for use in position determination, the "positioning phase".

Note that although the end user terminal had GNSS-capability, the end user can still benefit from using cellular/non-cellular positioning technologies in terms of time-to-first-fix and power consumption. Also, not all applications require highly accurate GNSS-based position (e.g. for local weather application it suffices to use cell-based location estimate). Also, cellular/non-cellular positioning technologies work indoors, which is generally a challenging environment for GNSS-based technologies.

Due to the increasing coverage with communication networks (e.g. using cellular telecommunication networks or WiFi networks) such radio nodes or often also deployed in mobile scenarios (e.g. being installed on buses and trains) leading to mobile radio nodes, e.g. moving WiFi access points. Additionally, such moving WiFi access points may also be (temporarily) established by mobile devices, such as mobile phones of end users (so called "personal hot spots"), for sharing an internet connection with other people or devices.

In the training or collecting phase, such moving radio nodes (e.g. WiFi access points) are considered highly poisonous to the positioning service because due to their constant movement no location information can be inferred from them. Collecting radio fingerprints with measurement information on signals from such moving radio nodes can cause significant damage to the position service, so that they are typically blacklisted from the positioning database.

However, such blacklisting also leads to a loss of potentially valuable information, in particular in view of the aims of the advertising industry and technology, which require an understanding where the consumer is, what the consumer is doing and where the consumer is going, as set out above. As explained, when considering the above moving radio nodes, there remains the problem that they would impair the quality of the positioning database when they are added to the positioning database and, moreover, that it is still difficult to differentiate between different kinds of moving radio nodes, i.e. for instance the radio node installed on a bus and e.g. the temporary personal hot spot of a user accidentally passing by.

SUMMARY OF SOME EMBODIMENTS OF THE INVENTION

It is inter alia an object of different embodiments of the invention to improve the information obtainable with positioning technologies, particularly in view of requirements of the advertising technologies, in particular without risking an impairment of the quality of positioning databases used for positioning. It is also an object of different embodiments of the invention to use readily available information, such as existing positioning database information to support advertising technology. It is further an object of different embodiments of the invention to provide targeted information, in particular advertising information, to a user of a mobile device.

According to a first exemplary aspect of the invention a (first) method, performed by at least one apparatus, is disclosed, the method comprising:
    obtaining a plurality of radio fingerprints, the radio fingerprints comprising information on radio nodes or signals from radio nodes observed by mobile devices and corresponding location estimates; and
    identifying, among said radio nodes, those radio nodes which are mobile radio nodes and which belong to a respective public transport vehicle, at least by relating movement information of a respective mobile radio node, said movement information being determined based on said obtained radio fingerprints, with public transport route information.

The first method may for instance be performed and/or controlled by an apparatus according to the first exemplary aspect, e.g. a server (in particular a cloud server) or a module thereof, as further described below.

According to a second exemplary aspect of the invention, a (second) method, performed by at least one apparatus, said method comprising:
    obtaining a database or a part thereof, said database comprising information on identified mobile radio nodes, which belong to a respective public transport vehicle;
    obtaining information on radio nodes or signals from radio nodes observed by the mobile device;
    determining, whether a user of said mobile device is using a respective public transport vehicle based on said information on identified mobile radio nodes, which belong to a respective public transport vehicle, and said obtained information on radio nodes or signals from radio nodes observed by the mobile device; and
    performing or triggering performing an action on said mobile device based on said determination, whether the user of the mobile device is using a respective public transport vehicle.

The second method may for instance be performed and/or controlled by an apparatus according to the second aspect, e.g. the mentioned mobile device or a module thereof, as further described below.

According to the first and second exemplary aspect of the invention, in each case an apparatus (also referred to as first and second apparatus, respectively) is disclosed, comprising means for performing a method according to the respective exemplary aspect of the invention. The means of the apparatus may be implemented in hardware and/or software. They may comprise for instance at least one processor for executing computer program code for realizing the required functions, at least one memory storing the program code, or both. Alternatively, they could comprise for instance circuitry that is designed to realize the required functions, for instance implemented in a chipset or a chip, like an integrated circuit. In general, the means may comprise for instance one or more processing means such as a processor and a memory. Optionally, the apparatus may comprise various other components, like a communication interface, a network interface, a radio interface, a data interface, a user interface etc.

According to the first and second exemplary aspect of the invention, in each case there is also an apparatus (referred to as first and second apparatus, respectively) disclosed, comprising at least one processor and at least one memory including computer program code; the at least one memory and the computer program code configured to, with the at least one processor, cause the apparatus to at least perform a method according to the respective exemplary aspect of the invention.

Thus, according to the first exemplary aspect of the invention, there is disclosed a (first) apparatus comprising at least one processor and at least one memory including computer program code, the at least one memory and the computer program code configured to, with the at least one processor, cause the apparatus at least to perform:
    obtaining a plurality of radio fingerprints, the radio fingerprints comprising information on radio nodes or signals from radio nodes observed by mobile devices and corresponding location estimates; and
    identifying, among said radio nodes, those radio nodes which are mobile radio nodes and which belong to a respective public transport vehicle, at least by relating movement information of a respective mobile radio node, said movement information being determined based on said obtained radio fingerprints, with public transport route information.

According to the second exemplary aspect of the invention, there is disclosed a (second) apparatus comprising at least one processor and at least one memory including computer program code, the at least one memory and the computer program code configured to, with the at least one processor, cause the apparatus at least to perform:

obtaining a database or a part thereof, said database comprising information on identified mobile radio nodes, which belong to a respective public transport vehicle;

obtaining information on radio nodes or signals from radio nodes observed by the mobile device;

determining whether a user of said mobile device is using a respective public transport vehicle based on said information on identified mobile radio nodes, which belong to a respective public transport vehicle, and said obtained information on radio nodes or signals from radio nodes observed by the mobile device; and performing or triggering performing an action on said mobile device based on said determination, whether the user of the mobile device is using a respective public transport vehicle.

As already described, the above-disclosed apparatuses according to any aspect of the invention may be a module or a component for a device, for example a chip. Alternatively, the disclosed apparatus according to any aspect of the invention may be a device, for instance a mobile device or a server. The disclosed apparatus according to any aspect of the invention may comprise only the disclosed components, for instance means, processor, memory, or may further comprise one or more additional components.

According to the first and second aspect of the invention, in each case there is also disclosed a non-transitory computer readable storage medium, in which computer program code is stored, the computer program code when executed by a processor causing at least one apparatus to perform a method according to the respective exemplary aspect of the invention. The storage medium may be a tangible storage medium, for example be a disk or a memory or the like. The computer readable storage medium may be intended for taking part in the operation of a device, like an internal or external memory, for instance a Read-Only Memory (ROM) or hard disk of a computer, or be intended for distribution of the program, like an optical disc. The storage medium may be a storage medium of an apparatus (e.g. a mobile device) according to the respective exemplary aspect of the invention.

According to the first and second exemplary aspect of the invention, in each case there is also disclosed computer program code, the computer program code, when executed by a processor, causing an apparatus to perform a method according to the respective exemplary aspect of the invention. The computer program code may be stored on a computer-readable storage medium, in particular a tangible and/or non-transitory medium, as described. The computer program code could be stored in the computer readable storage medium in the form of instructions.

The apparatus according to the first exemplary aspect of the invention and the apparatus according to the second exemplary aspect of the invention may be employed in a system, which is also an exemplary aspect of the invention.

Thus, according to a further exemplary aspect of the invention, a system is disclosed, the system comprising:

a first apparatus comprising at least one processor and at least one memory including computer program code, the at least one memory and the computer program code configured to, with the at least one processor, cause the first apparatus at least to perform:

obtaining a plurality of radio fingerprints, the radio fingerprints comprising information on radio nodes or signals from radio nodes observed by mobile devices and corresponding location estimates; and identifying, among said radio nodes, those radio nodes which are mobile radio nodes and which belong to a respective public transport vehicle, at least by relating movement information of a respective mobile radio node, said movement information being determined based on said obtained radio fingerprints, with public transport route information; and a second apparatus comprising at least one processor and at least one memory including computer program code, the at least one memory and the computer program code configured to, with the at least one processor, cause the second apparatus at least to perform:

obtaining a database or a part thereof, said database comprising information on identified mobile radio nodes, which belong to a respective public transport vehicle;

obtaining information on radio nodes or signals from radio nodes observed by the mobile device;

determining whether a user of said mobile device is using a respective public transport vehicle based on said information on identified mobile radio nodes, which belong to a respective public transport vehicle, and said obtained information on radio nodes or signals from radio nodes observed by the mobile device; and performing or triggering performing an action on said mobile device based on said determination, whether the user of the mobile device is using a respective public transport vehicle.

In the following, exemplary features and exemplary embodiments of all aspects of the present invention will be described in further detail.

The plurality of radio fingerprints may be received (e.g. at least in part wirelessly) at the apparatus of the first method, after they have been observed and collected by multiple mobile devices (the collecting devices). Accordingly, the first method may also comprise a sending or transmitting of the radio fingerprints from the mobile devices to the apparatus of the first method. Accordingly, the method may also comprise an observing of radio nodes by the mobile devices and a determining of the corresponding location estimates, also performed by e.g. the mobile devices. As surveying of many areas has already taken place in the past, the radio fingerprints may also be stored and readily available in a positioning database and obtained from there. The step of identifying can then be performed on the already collected and available fingerprint data, for instance.

Therein, the radio nodes may in particular be a cellular or non-cellular radio node that is a radio node of a cellular or non-cellular communication system. Preferably, the radio node is an access point, e.g. a WiFi access point (802.11 access point), as described further below in more detail.

Examples of a cellular communication system or network are a second generation (2G, for instance the Global System for Mobile Communication (GSM), the General Packet Radio System (GPRS), the Enhanced Data Rates for GSM Evolution (EDGE) or the High Speed Circuit-Switched Data (HSCSD)), third generation (3G, for instance the Universal Mobile Telecommunication System, UMTS, WCDMA, TD-SCDMA or CDMA-2000), fourth generation (4G, for instance the Long Term Evolution, LTE system, the LTE Advanced (LTE-A) system or the IEEE 802.16m WiMAX system) or fifth generation (5G) communication system.

Examples of a non-cellular communication system or network are a WLAN (e.g. WiFi) system, a Bluetooth (LE) system, a ZigBee system, a radio-frequency identification (RFID) system, a broadcasting network such as for instance Digital Video Broadcasting (DVB), Digital Audio Broadcasting (DAB) or Frequency-Modulated (FM)/Amplitude-Modulated (AM) system, a Near Field Communication (NFC) system, etc.

A cellular communication system may for instance be characterized by a basically seamless pavement of a geographical area (usually in the order of at least hundreds or thousands of square kilometers) with cells in which coverage is provided by respective nodes of the communication system that are operated by the same operator, which network may for instance support communication handover between cells. Consequently, a non-cellular communication system may be characterized as a communication system that does not have all of these properties.

In any case, the information on a respective radio node of such a system or the information on a respective signal thereof, observed by the mobile device, may in particular comprise at least an identifier or identification of the radio node (radio node ID). The information comprised by a radio fingerprint may however also comprise additional information.

In more detail, in case of a cellular radio node (i.e. a node of a cellular communication system), the information may contain
- a global and/or local identifier of the respective cellular radio node or cell observed,
- signal strength estimates,
- pathloss estimates, and/or
- timing measurements (such as Timing Advance or Round-Trip Time).

In case of a non-cellular radio node, the information may contain
- a global or local identifier of the respective non-cellular radio node (e.g. the BSSIDs, typically the MAC address of the air interface of a respective WiFi access points observed and/or the SSIDs),
- signal strengths estimates (e.g. received signal strength index, physical Rx level in dBm ref 1 mW, etc.),
- pathloss estimates, and/or
- timing measurements (e.g. Round-Trip Time).

The corresponding location estimates may be location estimates of the observing mobile device at the time the respective radio node or signal thereof was observed. In some cases, the location estimate may also be understood as an approximation of the location of the radio node itself. As an example, the location estimate may be based on a (global) navigation satellite system (examples of global navigation satellite system (GNSS) are "Global Positioning System" (GPS), "Galileo", "Global Navigation Satellite System" (i.e. "Globalnaja Nawigazionnaja Sputnikowaja Sistema", GLONASS), "BeiDou Navigation Satellite System" (BDS), or "Quasi-Zenith Satellite System" (QZSS)) or the location estimates may additionally or alternatively be based on signals of radio nodes (e.g. a WiFi-based location estimate).

The collected fingerprints can provide movement information on a (potential) movement of the observed radio nodes, e.g. because identifiers of the same radio nodes are observed at (sufficiently) different locations. This may for instance allow determining single locations and/or a movement history of the respective node. Also, with sufficiently many locations, this may allow deriving an (at least partially substantially continuous) movement pattern of a respective radio node. Thus, the movement information of a respective radio node may in particular comprise collected or aggregated location estimates of the radio node.

The public transport route information is in particular understood to be information on the route taken or to be taken by the respective public transport vehicle. The public transport route information may be publicly available or readily accessible information, which may be provided by the authority or company responsible for the respective public transport vehicle or system. For instance, the public transport route information may be requested and/or obtained online from the authority or company responsible for the respective public transport vehicle or system. The public transport route information may in particular comprise location information of routes (e.g. regarding the start, stop and/or course of the route) taken by the respective public transport vehicle, as explained in more detail below.

Therein, public transport (also known as public transportation, public transit, or mass transit) is in particular understood to be a transport of passengers typically by group travel systems available for use by the general public, typically managed on a schedule, operated on established routes, and that charge a posted fee for each trip. However, not all of those properties may apply, such as for instance in case of a public transport via taxi. A public transport may generally be a transport on ground, water or in the air.

The determined movement information can then be related to the public transport route information. This may be done by comparing or correlating the movement information with the public transport route information. For instance at least one, some or all location estimates of a certain radio node comprised by the movement information may be compared with a certain route from the transport route information. The relating of the movement information to the public transport route information may in particular comprise a checking, whether movement information of a certain radio node is (sufficiently) similar to or (sufficiently) correlates with the public transport route information.

This can allow not only identifying any mobile radio nodes, but specifically those radio nodes, which are mobile radio nodes and which belong to a respective pubic transport vehicle. That the radio node belongs to the public transport vehicle is in particular understood to mean that the radio node is constantly on board the public transport vehicle. For instance, the radio node may be permanently affixed to the public transport vehicle. However, the radio node can generally be attached the vehicle on the inside or outside. For instance, the radio node may be integrated into the vehicle. The radio node may be fixedly attached to the structure of the vehicle. The radio node may be powered by the power system of the vehicle, for instance.

The information about the identified radio nodes, which are mobile radio nodes and which belong to a public transport vehicle can be advantageously utilized particularly in further positioning and/or advertising scenarios of a user of a mobile device. For this, the information may be stored in a database, e.g. a positioning database or a separate database.

Such a database can then be obtained and utilized in further methods such as the method according to the second aspect of the invention. For this, the database (or a part thereof) is obtained by a (second) apparatus (which may be the mobile device of the method of the second aspect, for instance).

The mobile device observes information on radio nodes or signals therefrom, which may in particularly comprise at least an identifier or identification of the radio node (e.g. some or all of the information also comprised by the radio fingerprints described with respect to the first aspect).

This obtained information on the observed radio nodes or signals together with the information from the obtained database (indicating the identified mobile radio nodes, which belong to a public transport vehicle) can be used for a determining, whether a user of the mobile device is using a respective public transport vehicle. The determining may for instance comprise or utilize a comparison of the radio nodes observable by the mobile device with the radio nodes identified by the database to be mobile radio nodes belonging to a public transport vehicle.

If it is determined that the user of the mobile device is using a respective public transport vehicle, an action on said mobile device may be triggered or performed or adapted accordingly. The action may for instance comprise requesting, obtaining and/or showing certain information and/or content. The action may not be performed otherwise or may be performed with a different content otherwise (i.e. if it cannot be determined that the user is using a public transport vehicle).

Furthermore, the action performed or triggered may also depend on further factors, such as the supplemental public transport information described further below, e.g. the public transport vehicle or system, the type thereof and/or the destination of the route of the public transport vehicle, just to name some examples. For instance, in dependence of these factors, a different action may be performed or triggered or the action may be performed or triggered with a different content.

The approach described has certain advantages over the standard positioning technologies. With standard positioning technologies, it is often impossible to deduce the exact mode or context of transportation. While a discrimination between certain modes of transportation (e.g. pedestrian, cycling and motor-based transportations) may still be realized, e.g. using various sensors (location and sensor-based information, e.g. accelerometer information), it is not possible or trivial to reliably distinguish between similar modes of transportation (e.g. different motor-based transportations, such as a personal car, a taxi and a bus). However, with the approach described above, this can be reliably achieved, because the obtained information about the identified radio nodes, which are mobile radio nodes and which belong to a public transport vehicle, are of high value in this regard, as the knowledge specifically about those mobile radio nodes, which belong to a public transport vehicle, allows for differentiating even between very similar modes of transportation, normally resulting in correspondingly similar and thus often indistinguishable sensor outputs.

As an example, this reliable determination of a mode or context of transportation of a user may be of relevance from an advertising perspective, as there is a large difference between triggering an advertisement to a person's mobile device when the person is in a car (especially when the person is driving) or to a person in a bus. While in the first case the advertisement may be a waste of effort, in the second case the advertisement can be very effective. This is because in a bus, a person typically has much of their concentration on the mobile device and is thus prone to read and follow advertisements. Hence, detecting a public transport context such as the use of a bus or a tram can be of high value to the advertisement business stakeholders.

According to an exemplary embodiment of the different aspect of the invention, the first method further comprises:
tagging, in a database, said identified mobile radio nodes, which belong to a respective public transport vehicle.

Tagging the identified mobile radio nodes may be understood as marking or flagging the respective mobile radio node in the database. The database may for instance comprise different datasets, e.g. a different dataset for each radio node, at least some or each data set storing information about a respective radio node (e.g. at least an identifier of the radio node). The tagging may be realized by storing, in a respective dataset, information indicating that the respective radio node has been identified as a mobile radio node belonging to a respective public transport vehicle. The tagging may also be realized implicitly by adding certain information to the respective dataset, such as the supplemental public transport information as described further below. Therein, the database may generally be a general positioning database. However, alternatively, the database may also be a dedicated database specifically used for (and e.g. only comprising information about) mobile radio nodes belonging to public transport vehicles. In each case, this may have the effect of being able to maintain a positioning database without impairing the usual positioning techniques by not blacklisting but storing information about mobile radio nodes.

According to an exemplary embodiment of the different aspects, the first method further comprises:
associating, in a database, said identified mobile radio nodes, which belong to a respective public transport vehicle, with respective supplemental public transport information related to said respective public transport vehicle or related to a public transport system comprising said respective public transport vehicle.

As explained above, the database may be a positioning database or a database dedicated to storing information about mobile radio nodes. For instance, the database may comprise datasets, at least some or each dataset comprising respective radio node information (e.g. the identifier thereof) and respective supplemental public transport information, thereby associating the information. The supplemental public transport information may go beyond the information that the respective radio has been identified as a mobile radio node belonging to a respective public transport vehicle. For instance, the supplemental public transport information may for instance comprise information about the public transport vehicle, the corresponding public transport system or the route taken or to be taken by the public transport vehicle, as further explained below. This may have the advantage of being able to retrieve additional or more precise information about the respective transportation context. This may allow for providing an improved provision of targeted information, such as advertising.

According to an exemplary embodiment of the different aspects of the invention, said respective public transport vehicle is a motorized public transport vehicle and/or one of
a bus;
a rail vehicle;
a taxi;
a boat; and/or
an aircraft.

A bus may for instance be a city bus, a trolley bus, a coach or a water bus. A rail vehicle may for instance be a train, an intercity train, a tram, a metro, a subway or an underground train. A boat may be a ferry, a water bus or a water taxi. In each case, there is the advantage of being able to reliably identify mobile radio nodes belonging to a respective public transport vehicle, and to accordingly reliably determine if a user of a mobile device is using a respective public transport vehicle, so that e.g. tailored actions may be performed on the mobile device (e.g. provide advertising information tailored for a respective vehicle).

According to an exemplary embodiment of the different aspects of the invention, said identifying of those radio nodes, which are mobile radio nodes and which belong to a respective public transport vehicle, is at least in part based on a machine learning algorithm. Thus, the apparatus may use statistical techniques to be able to identify the mobile radio nodes belonging to a respective public transport vehicle reliably and in particular to progressively improve performance on this specific task particularly with increasing amounts of data. This has the advantage of an efficient and reliable identification of the respective mobile radio nodes belonging to a public transport vehicle.

According to an exemplary embodiment of the different aspects of the invention, said identifying of those radio nodes, which are mobile radio nodes and which belong to a respective public transport vehicle, comprises:
    identifying, among said radio nodes, those radio nodes which are mobile radio nodes; and
    subsequently identifying, among said identified mobile radio nodes, those mobile radio nodes, which belong to a respective public transport vehicle.

This approach may have the advantage of an improved efficiency in identifying the relevant radio nodes. For instance, a first identification action, among all radio nodes, is performed in order to identify only those radio nodes, which are (general) mobile radio nodes (irrespective of whether they belong to a public transport vehicle). Identifying these mobile radio nodes in the (larger) set of radio nodes may be achieved comparatively fast. However, this may not be sufficient for assuming that the identified radio node belongs to a public transport vehicle, as it may also be the case that a mobile radio node is e.g. a personal hot spot passing by in a car. Then, on this reduced set of mobile radio nodes, a second identification action can be performed in order to identify, among the (already reduced) set of identified mobile radio nodes, only those mobile radio nodes, which belong to a respective public transport vehicle. This may be achieved by a comparison of the movement information of a respective mobile radio node with the public transport route information.

There may be the case, that further information or actions are necessary or advantageous for identifying or verifying the transportation mode or context of a radio node or further information thereon. This may in particular be achieved by considering real-time position information on public transport vehicles, as this may allow for eliminating ambiguities, which arise e.g. due to the fact that public transport vehicles such as trains or buses are being employed on different routes.

According to an exemplary embodiment of the different aspects of the invention, said identifying of those radio nodes, which are mobile radio nodes, comprises:
    determining those radio nodes, the movement of which lies above a predetermined threshold.

Utilizing a predetermined threshold of movement for identifying mobile radio nodes may increase the efficiency and reliability for distinguishing between (fixed) radio nodes and mobile radio nodes. As explained in the following, the predetermined threshold may take different forms.

In particular and according to an exemplary embodiment of the different aspects of the invention, said predetermined threshold defines a minimum degree of movement with regard to space and/or time. For instance, the predetermined threshold may define a minimum distance. Accordingly, only radio nodes showing a movement above certain distance may be considered as mobile radio nodes. For instance, the predetermined threshold may also define a maximum time. Accordingly, only radio nodes showing a certain movement within a certain time may be considered as mobile radio nodes. However, the predetermined threshold may also define a minimum time, so that only radio nodes moving at least for a certain time period may be considered mobile radio nodes. For instance, the predetermined threshold may define a minimum frequency. Accordingly, only radio nodes showing a certain movement sufficiently frequently may be considered as mobile radio nodes.

According to an exemplary embodiment of the different aspects of the invention, the first method further comprises:
    utilizing real-time position information indicating a position of a respective public transport vehicle
        for identifying those radio nodes, which are mobile radio nodes and which belong to a respective public transport vehicle, and/or
        for verifying said identified mobile radio nodes, which belong to a respective public transport vehicle, and/or
        for determining supplemental public transport information related to said respective public transport vehicle or related to a public transport system comprising said respective public transport vehicle.

As already explained, the real-time position information may for instance be published by and/or obtained from a respective transport authority or company. The real-time position information may be created with a real-time location system (RTLS) for tracking the respective public transport vehicles of the public transport system, for instance. Such a system may employ different kinds of technologies, such as GNSS technology, WiFi positioning technology, radio frequency (RF) technology, optical (e.g. infrared) or acoustic (e.g. ultrasound) positioning technologies.

In one embodiment, the real-time position information of the public transport vehicle is used for identifying mobile radio nodes belonging to said public transport vehicle. Thus, the real-time position information can be one example of the public transport route information. In another embodiment, the real-time position information may alternatively or additionally be used for verifying the already identified mobile radio nodes belonging to a respective public transport vehicle. Thus, the real-time position information may only be used for confirming the already identified mobile radio nodes as being mobile radio nodes, thus increasing the confidence of the result. In a further embodiment, the real-time position information may alternatively or additionally be used for determining the supplemental public transport information, such as determining the correct railway line or bus line, for which the respective public transport vehicle is used. Thus, utilizing real-time position information as described above may have the advantage of increasing the reliability of the identification of the mobile radio nodes belonging to a public transport vehicle and the quality of supplemental public transport information.

According to an exemplary embodiment of the different aspects of the invention, the respective supplemental public transport information comprises one or more of
    information about or representative of a respective public transport vehicle;
    an identification of a respective public transport vehicle;
    information about or representative of a route of said respective public transport vehicle;

an identification of a route of said respective public transport vehicle; and/or information about or representative of a public transport system comprising said respective public transport vehicle.

As an example, information about or representative of a public transport vehicle may be the type of the vehicle (e.g. a bus, a train etc.), an identifier or an identification of the vehicle (e.g. "train ID 123" or "bus ID 456"), information about or representative of the route the vehicle is use for, such as an identification of the route (e.g. "bus line 707", "train from A to B") or a destination of the vehicle. As an example, information about or representative of a public transport system comprising said respective public transport vehicle may be a name of the public transport system (e.g. "national railway of country A", "bus authority of city B"). These exemplary embodiments may in each case have the technical effect that for a user's mobile device, which observes a respective mobile radio node on a respective public transport vehicle, not only the mode of transportation but also a detailed context of transportation can be easily determined with the supplemental public transport information. This may allow, depending on the use case, e.g. a particularly tailored presentation of advertising to the user.

According to an exemplary embodiment of the different aspects of the invention, said first method further comprises:

providing a database or a part thereof, said database at least comprising information on said identified mobile radio nodes, which belong to a respective public transport vehicle, and optionally further comprising respective supplemental public transport information associated with said respective identified mobile radio nodes, which belong to a respective public transport vehicle.

The database or part thereof may be provided to a mobile device (e.g. over the internet). This may in particular be a mobile device as described with respect to the second aspect. As described, the database or part thereof may then advantageously be used by the receiving device for determining, whether a user of said mobile device is using a respective public transport vehicle based on said information comprised by the database, i.e. information on identified mobile radio nodes, which belong to a respective public transport vehicle, and said obtained information on radio nodes or signals from radio nodes observed by the mobile device. Accordingly, the respective device may receive the database or part thereof.

The database or part thereof may be provided to the mobile device upon request of the mobile device. Alternatively, the database or part thereof may be preinstalled or pushed to the mobile device. The version of the database (or part thereof) stored at the mobile device may be updated regularly or as needed.

For instance, only a part of a generally larger database (e.g. covering multiple countries) may be provided. For example, the part of the database may be geographically limited, e.g. it may only cover a certain area, such as a country, a state, a city or a region.

As already explained, the database may comprise datasets storing information about a respective radio node (e.g. at least an identifier of the radio node) and preferably supplemental public transport information, as already described above, as well.

According to an exemplary embodiment of the different aspects of the invention, said public transport route information at least comprises information on one or more of:

a start point of a public transport route;
an end point of a public transport route;
a course of a public transport route or sections thereof;
waypoints of a public transport route; and/or
a stopover of a public transport route.

All of the above public transport route information may be stored by means of one or more (e.g. two dimensional or three dimensional) coordinates, e.g. geographical coordinates, e.g. latitude, longitude, and or height. For instance a start point, an end point, a waypoint and a stopover location may be stored with respective coordinates each. In any case, the public transport route information may be stored such that the movement information of a respective mobile radio node can be related (that is e.g. correlated or compared) with the public transport route information. For instance, considering the example of a bus as a public transport vehicle, a start point and an end point may be the first and last stop or station of the line, the bus is serving. However, these points may also be identical, e.g. in case of a round trip route. An example of a stopover is a bus station, terminal or service area. The course of the route may be comprised by multiple way points, e.g. such that the waypoints provide a substantially continuous representation of the route. Considering the case of a taxi as a public transport vehicle, a stopover location may be a taxi stand or stop.

Additionally, the public transport route information may comprise time information on the respective public transport route. For instance, the time information may indicate times the vehicle is at or passes the respective start point, end point or waypoints (such as bus stops). Also, a time or time window may be provided indicating the time during which the route is operational or being served.

The described embodiments all have the technical effect of improving the described relating of the movement information of a respective mobile radio node with public transport route information, which enables an identification of those radio nodes which are not only mobile radio nodes but which also belong to a respective public transport vehicle.

According to an exemplary embodiment of the different aspects, said radio nodes are one or more of wireless access points;
WiFi access points; and/or
Bluetooth beacons.

Specifically, the wireless access point may be an access point according to one or more of the IEEE 802.11 standards or WiFi standards. Accordingly, the wireless network of the wireless access point may be a non-cellular network according to one or more of the IEEE 802.11 family of standards (also marketed under the Wi-Fi brand name). The wireless access point may for instance operate at least on a single frequency band (2.4 GHz according to IEEE 802.11b/g or 5.0 GHz according to IEEE 802.11a/h/ac, representing the two frequency bands 2.4-2.4835 GHz, and 5.15-5.725 GHz, respectively), or at least on two frequencies bands (2.4 GHz and 5.0 GHz according to IEEE 802.11n, again representing the two frequency bands 2.4-2.4835 GHz, and 5.15-5.725 GHz, respectively).

However, the radio node may also be a wireless access point according to another wireless local area network (WLAN) standard. Generally, a WLAN is understood to be a wireless computer network that links two or more devices using wireless communication within a limited area such as building or a vehicle, which gives users the ability to move around within a local coverage area and yet still be connected to the network. A wireless access point according to one or more of the IEEE 802.11 standards is preferred though, as most modern WLANs are based on IEEE 802.11 standards. Alternatively, the radio node may be a radio node (in particular a beacon) according to the Bluetooth or Bluetooth LE standard, at least comprising a Bluetooth (LE) transmitter.

The above embodiments may in particular have the advantage that the described technologies are supported by many mobile devices, so that a detection of the respective radio node and thus the obtaining of information on the radio node or signals from radio nodes observed by the mobile device, as described with respect to the second aspect, are well-supported.

According to an exemplary embodiment of the different aspects, said determining, whether a user of the mobile device is using a respective public transport vehicle is based on a comparison of said information on identified mobile radio nodes, which belong to a respective public transport vehicle, and said obtained information on radio nodes or signals from radio nodes observed by the mobile device.

For instance, the mobile device may observe (e.g. via the radio interface of the mobile device) the radio nodes or signals (e.g. respective identifiers of the observed radio nodes or signals) in its surrounding and thus obtain the information thereon. This information can then be compared or matched to the information on the identified mobile radio nodes comprised by the database (which may comprise the same information, i.e. for instance also identifiers of the observed radio nodes or signals, but collected and stored during a previous collecting or training phase). In case of matching radio nodes (e.g. matching identifiers), it may be deduced that the user of the mobile device is using a respective public transport vehicle.

However, it may be necessary that further requirements are fulfilled in order to determine that a user of the mobile device is using a respective public transport vehicle. For instance, it may be necessary that the respective radio node, identified as mobile radio node, which belongs to a public transport vehicle, is not only observable once or shortly, but e.g. for certain period of time or multiple times in a row. This may avoid erroneously determining that a user is using a public transport vehicle, which is however only nearby the user or passing by the user, for instance.

While generally any action may be performed or triggered on the mobile device, according to an exemplary embodiment of the different aspects, said action on said mobile device is preferably a presentation of advertising. For instance, the presentation of advertising may only be triggered or performed, if it is determined that the user of the mobile device is using a respective public transport vehicle. Therein, the specific advertising presented may depend on further factors, such as the supplemental traffic information (e.g. which public transport vehicle the user is using, where the public transport vehicle is going etc.). For instance, if it cannot be determined that the user is using a public transport vehicle, a different advertising may be presented or the advertising may not be presented at all.

Specifically the presentation of advertising can advantageously be made dependent on the described determination of a mode or context of transportation of a user. As explained, there is a large difference between triggering an advertisement to a person's mobile device when the person is in a car (especially when the person is driving) or to a person in a public transport vehicle, such as a bus. While in the first case the advertisement may be a waste of effort, in the second case the advertisement can be very effective. This is because in a bus, a person typically has much of their concentration on mobile device and is thus prone to read and follow advertisements. Hence, detecting a public transport context, such as the use of a bus or a tram, can be of high value to the advertisement business stakeholders.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

SHORT DESCRIPTION OF THE FIGURES

DETAILED DESCRIPTION OF EXAMPLE EMBODIMENTS OF THE INVENTION

The following description serves to deepen the understanding of the present invention and shall be understood to complement and be read together with the description as provided in the above summary section of this specification.

Figure 1:
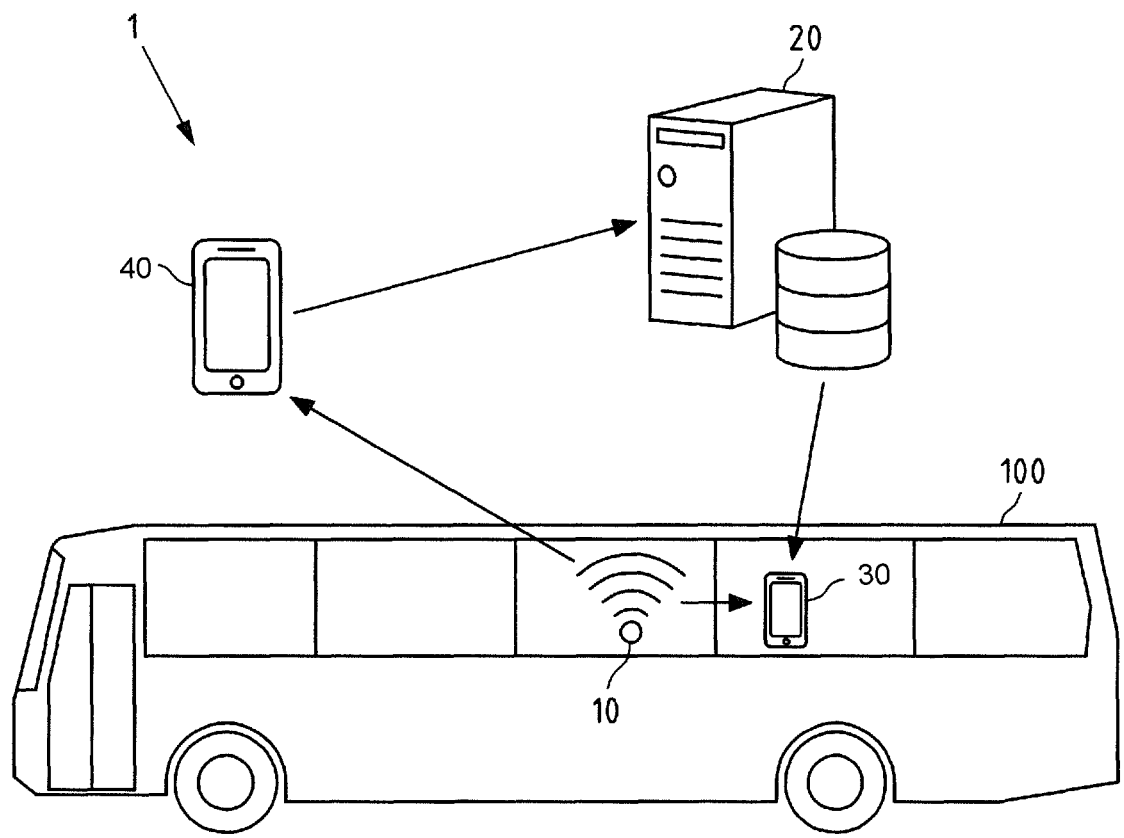
FIG. 1 is a diagram of a system according to an exemplary embodiment of the invention.

FIG. 1 is a diagram of a system 1 comprising a radio node 10 belonging to a public transport vehicle 100, which is in this case a bus, a first apparatus 20, which is in this case a server, a mobile device 30, which is in this case a smart phone and which is an example of mobile device according to the different aspects and also an example of a second apparatus according to the invention. The radio node 10 is in this case a wireless access point, more specifically a WLAN access point according to the IEEE 802.11 standard (Wi-Fi access point). The first apparatus or server 20 may be a server or a computer cloud remote from the public transport vehicle 100 and mobile device 30. The mobile device 30 may alternatively be realized by a personal digital assistant, a laptop computer, a tablet computer or a wearable, for instance.

Also depicted is a mobile device 40, which may be used in the training or collecting phase (radio mapping) and which may generally be a mobile device as described with respect to mobile device 30 (e.g. a cellular phone or the like).

The apparatuses 10, 20, 30, 40 may separately or together perform exemplary embodiments of the different methods according to the invention. Further details of wireless access point 10, server 20 and mobile devices 30, 40 are described in the following with respect to FIGS. 2, 3 and 4, respectively, which are exemplary block diagrams of the respective apparatuses.

While the invention will be exemplarily described particularly with respect to a wireless access point 10 as an example of a radio node and a bus 100 as an example of a public transport vehicle, the following explanations are also applicable to other radio nodes or other public transport vehicles.

Figure 2:
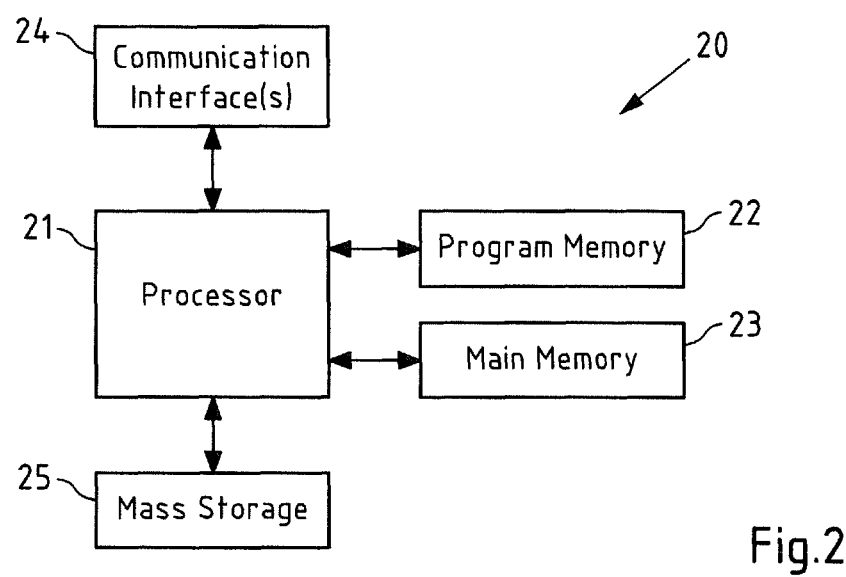
FIG. 2 is a block diagram of the server of FIG. 1 as an example of an apparatus according to the first aspect of the invention.

Turning now to FIG. 2, an exemplary block diagram of a server 20 of FIG. 1 is shown. Server 20 comprises a processor 21. Processor 21 may represent a single processor or two or more processors, which are for instance at least partially coupled, for instance via a bus. Processor 21 may use program memory 22 and main memory 23 to execute a program code stored in program memory 22 (for instance program code causing server 20 to perform embodiments of the first method, when executed on processor 21). Some or all of memories 22 and 23 may also be included into processor 21. One of or both of memories 22 and 23 may be fixedly connected to processor 21 or at least partially removable from processor 21. Program memory 22 may for instance be a non-volatile memory. It may for instance be a FLASH memory, any of a ROM, PROM, EPROM and EEPROM memory or a hard disc, to name but a few examples. Program memory 22 may also comprise an operating system for processor 21. Main memory 23 may for instance be a volatile memory. It may for instance be a RAM or DRAM memory, to give but a few non-limiting examples. It may for instance be used as a working memory for processor 21 when executing an operating system and/or programs.

Processor 21 further controls one or more communication interfaces 24 configured to receive and/or send information. For instance, server 20 may be configured to communicate with mobile device 30 and/or 40 of system 1 of FIG. 1. Such a communication may for instance comprise a receiving, from mobile surveying devices (such as mobile device 40), a plurality of radio fingerprints. The radio fingerprints may comprise information on radio nodes or signals from radio nodes (such as wireless access point 10), which are observed by the mobile devices 40. The radio fingerprints typically also comprise a corresponding location estimate of the mobile device at the time of observing the radio node or signal therefrom. Such a communication may also comprise providing, to a mobile device, such as mobile device 30, a database (or a part thereof), wherein the database at least comprises information (e.g. an identifier) on identified mobile radio nodes, which belong to a respective public transport vehicle, such as wireless access point 10 belonging to bus 100. In each case, the communication may for instance be based on a (e.g. partly) wireless connection. The communication interface 24 may thus comprise circuitry such as modulators, filters, mixers, switches and/or one or more antennas to allow transmission and/or reception of signals. In embodiments of the invention, communication interface 24 is inter alia configured to allow communication according to a 2G/3G/4G/5G cellular communication system and/or a non-cellular communication system, such as for instance a WLAN network.

Processor 21 further interfaces with a mass storage 25, which may be part of the server 20 or remote from server 20, and which may for instance be used to store one or more databases. For instance, server 20 may store, in a database, collected information from crowd sourcing processes. The database may for instance store obtained radio fingerprints of radio signals from radio nodes (such as wireless access point 10) measured by mobile devices (such as mobile device 40) at different locations. The radio fingerprint data can be used to identify mobile radio nodes belonging to a public transport vehicle. This information may then be stored in the same or a separate database. Also, the radio fingerprint data can be used to assemble respective radio map data (e.g. only from the non-mobile radio nodes, i.e. the radio nodes which have not been identified as mobile radio nodes).

The components 22-25 of server 20 may for instance be connected with processor 11 by means of one or more serial and/or parallel busses.

Figure 3:
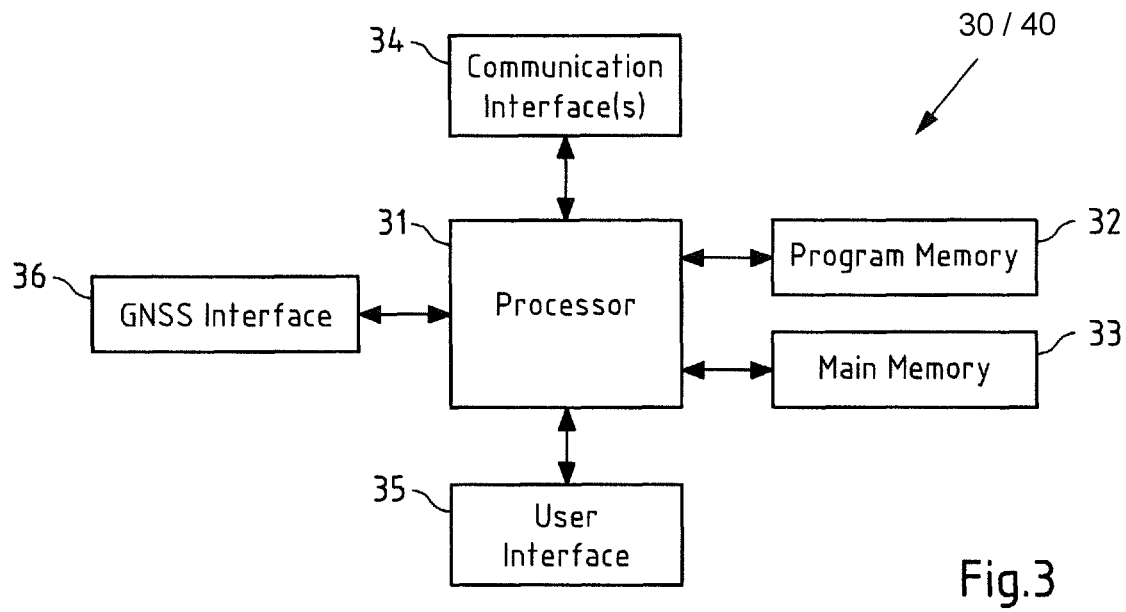
FIG. 3 is a block diagram of a mobile device of FIG. 1 as an example of an apparatus according to the second aspect of the invention.

Turning now to FIG. 3, an exemplary block diagram of a mobile device, such as mobile device 30 or 40 of FIG. 1 is shown. Similarly to FIG. 2, mobile device 30/40 comprises a processor 31. Processor 31 may represent a single processor or two or more processors, which are for instance at least partially coupled, for instance via a bus. Similar to FIG. 2 processor 31 may use program memory 32 and main memory 33 to execute a program code stored in program memory 32 (for instance program code causing mobile device 30 to perform embodiments of the second method, when executed on processor 31).

Processor 31 further controls a communication interface 34 configured to receive and/or send information. For instance, in case of mobile device 30, the mobile device 30 may be configured to at least communicate with wireless access point 10 and/or server 20 of system 1 of FIG. 1. In case of mobile device 40, this communication may comprise obtaining information on radio nodes or signals from radio nodes (such as wireless access point 10) and/or sending, to server 20, a plurality of radio fingerprints, the radio fingerprints comprising information on radio nodes or signals from radio nodes (such as wireless access point 10) observed by the mobile device 40 and corresponding location estimates of mobile device 40. In case of mobile device 30, this communication may comprise obtaining information on radio nodes or signals from radio nodes (such as radio node 10) and/or receiving a database or a part thereof, said database at least comprising information on said identified mobile radio nodes, which belong to a respective public transport vehicle (such as wireless access point 10 of bus 100).

The described communication may for instance be based on a (e.g. partly) wireless connection. The communication interface 34 may thus comprise circuitry such as modulators, filters, mixers, switches and/or one or more antennas to allow transmission and/or reception of signals. For instance, communication interface 34 is at least configured to allow communication according to a non-cellular communication system, such as for instance a WLAN network, in order to communicate with wireless access point 10. In embodiments of the invention, communication interface 34 may also be configured to allow communication according to a 2G/3G/4G and/or 5G cellular communication system, in particular to communicate with server 20.

Generally, it may also be the case, that mobile device 30 communicates with server 20 over wireless access point 10, e.g. in case wireless access point 10 provides internet access to mobile device 30.

Processor 31 further controls a user interface 35 configured to present information to a user of mobile device 30/40 and/or to receive information from such a user, such as manually input position fixes or the like. User interface 34 may for instance be the standard user interface via which a user of mobile device 30/40 controls other functionality thereof, such as making phone calls, browsing the Internet, etc.

Processor 31 may further control a GNSS interface 36 configured to receive positioning information of an GNSS such as Global Positioning System (GPS), Galileo, Global Navigation Satellite System (i.e. "Globalnaja Nawigazionnaja Sputnikowaja Sistema", GLONASS) or Quasi-Zenith Satellite System (QZSS). In case of mobile device 40, the positioning information of GNSS interface 36 (potentially in connection with further sensors of mobile device 40, such as inertial sensor, e.g. accelerometer or gyroscope) may be used in order to obtain location estimates for the collection of radio fingerprints.

Exemplary embodiments of the different methods will now be described in more detail with reference to FIGS. 4-6. In the given example, the following five stages can be identified, which will be described in more detail below:
the crowd-sourcing or collecting stage,
the extracting stage,
the correlating or detecting stage,
the tagging stage, and
the triggering stage.

Figure 4:
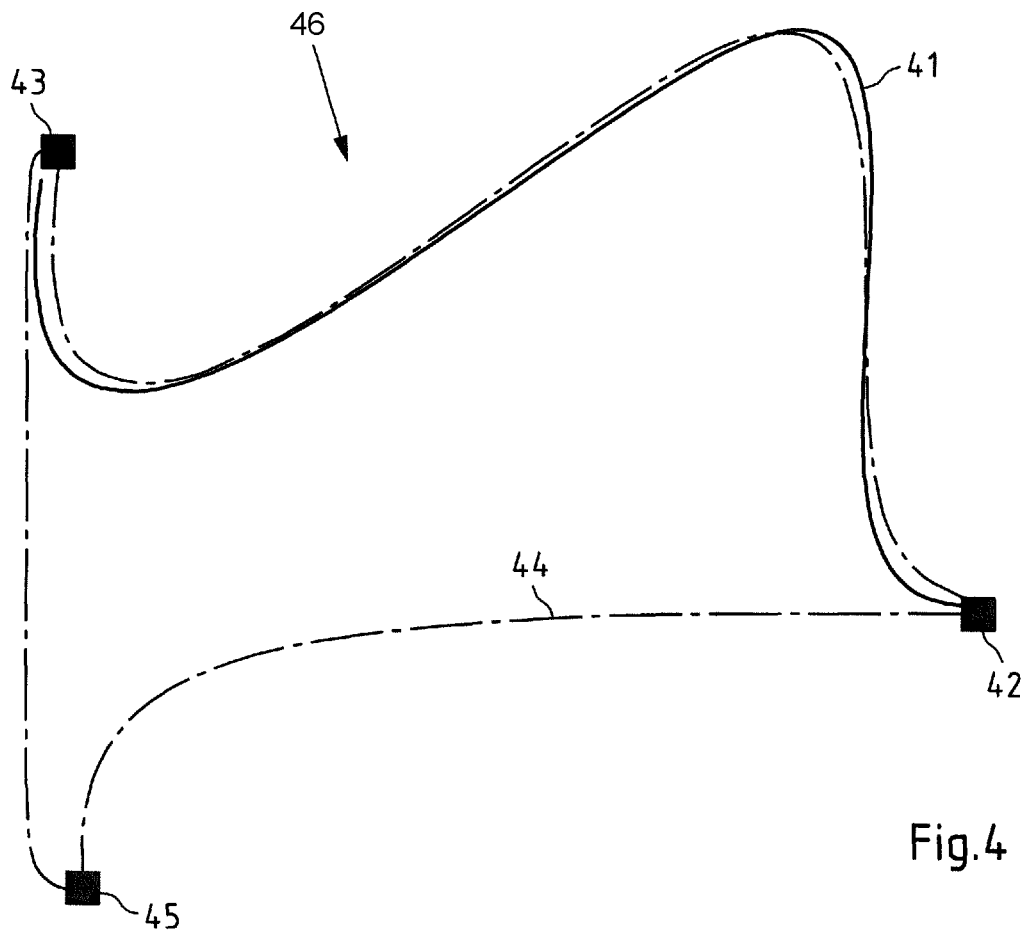
FIG. 4 is a schematic illustration of a route taken by the public transport vehicle of FIG. 1.

First, reference is made to FIG. 4, which is a schematic illustration of a route 46 taken by bus 100 of FIG. 1. The solid line 41 extending between a first route point 42 (e.g. a start point) and a second route point 43 (e.g. an end point) illustrates the route 46 as it is known and as it may be obtained from a bus transport authority or company, for instance. This information may either be based on a general bus route plan or on real-time information of the bus location. Route 46 is an example of public transport route information. Also shown in FIG. 4, as the dashed line 44, is the movement information as it is determined based on obtained radio fingerprints. In this case, this is a crowd-sourced movement pattern of wireless access point 10 belonging to bus 100. As can be seen, the movement information determined based on the radio fingerprints also shows the movement of the bus 100 with a stopover at a service area 45. A comparison between the movement information 44 based on the radio fingerprints and the public transport route information 41 now allows determining that the wireless access point 10 belongs to bus 100 and thus to identify wireless access point 10 as a mobile radio node belonging to a public transport vehicle.

Figure 5:
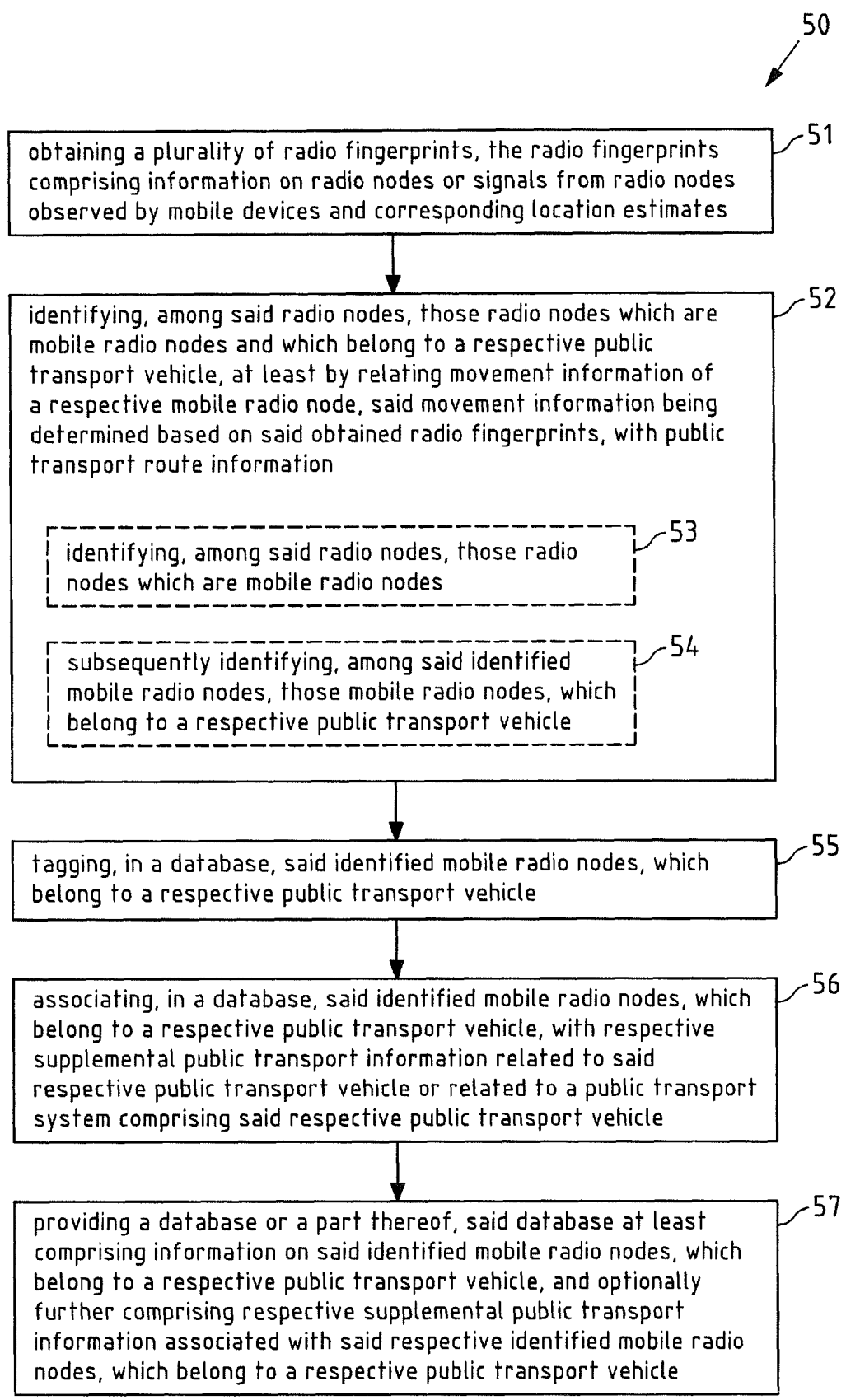
FIG. 5 is a flow chart illustrating an example of a method according to the first aspect.

FIG. 5 is a flow chart 50 illustrating an exemplary embodiment of a first method, exemplarily performed by server 20.

In action 51 (which may also be referred to as the crowd-sourcing or collecting stage), a plurality of radio fingerprints are obtained, wherein the radio fingerprints comprise information on radio nodes or signals from radio nodes (such as wireless access point 10) observed by mobile devices (such as mobile device 40) and corresponding location estimates. Particularly, this stage may provide a more-or-less constant inflow of fingerprints to a machine learning system.

This stage may work as generally known for harvesting or crowd-sourcing radio fingerprints for other modern local or global WiFi-based positioning systems based on crowd-sourcing. The devices that collect fingerprints may typically also be those devices that use the positioning service. An important aspect here is to have a sufficient number of devices collecting the fingerprints, which need to be spread geographically so that the fingerprints are captured at least regionally or even globally. The approach described herein utilizes the incoming data not only for building up a "usual" positioning database, but also for learning as far as possible the mode or context of transportation of the respective mobile radio nodes. Having this information in a database allows using the existing system in addition to normal positioning approaches for a wider variety of use cases, such as adtech.

In action 52, specifically those radio nodes are identified among the radio nodes, which are mobile radio nodes and which belong to a respective public transport vehicle. This is done by at least relating the movement information of a respective mobile radio node (which has been determined based on said obtained radio fingerprints) with the public transport route information.

Specifically, this action may be realized in a two stage approach.

In action 53 (which may also be referred to as the extracting stage), those radio nodes are identified among the radio nodes, which are mobile radio nodes. In the example system described above, those wireless access points are extracted from the mass of wireless access points that are in motion almost every day.

As already explained, such mobile or moving wireless access points are highly poisonous to the positioning service, because no location information can be inferred from them due to their constant movement. However, there is a growing number of such access points in the world, as wireless access points are being installed on buses or trains and additionally mobile devices can also be used as hotspots. As collecting fingerprints from such mobile wireless access points can cause significant damage to the position service, machine learning components analyze the incoming fingerprints to detect such moving/mobile wireless access points. Instead of blacklisting these access points completely from positioning, as these moving/mobile access points are of no use for positioning, they can be used for mode or context detection. This requires being able to learn the access points characteristics, i.e. whether it is random mobile hotspot or fixed to a bus or train.

In action 54 (which may also be referred to as the correlating or detecting stage), those mobile radio nodes are identified among the identified mobile radio nodes, which belong to a respective public transport vehicle. In the example described above, the wireless access points movement patterns are correlated with the known bus routes and those wireless access points with a movement pattern matching to a bus route is detected. In this way, it can be understood, if a moving/mobile access point is in fact installed in a bus. As already explained, many cities publish a wealth of information on the public transport systems including routes, schedules and real-time locations of public transport vehicles. This information can readily be correlated with the collected radio node movement history. This idea has conceptually already been illustrated in and described with respect to FIG. 4. Furthermore, the real-time information on the bus location can additionally be used to build-up confidence on the detection.

One complication to keep in mind may be that a public transport vehicle may take different routes on different days. The detection mechanism may thus factor in that the route which the vehicle and thus the radio nodes takes may change from day to day or even within a single day. Therefore, while detecting that a radio node is installed in public transport vehicle can be done at the time collecting the fingerprint, it may be more challenging to unambiguously say, which particular route/line the vehicle, to which the radio node is installed, is serving at a specific time, e.g. at the time it shall be determined that a user is using a public transport vehicle.

One option to overcome this issue is using the already mentioned real-time location information of the respective public transport vehicle.

In actions 55 and 56 (which may be referred to as the tagging stage), the identified mobile radio nodes, which belong to a respective public transport vehicle, are tagged in a database. Optionally, supplemental public transport information related to the respective public transport vehicle or related to a public transport system comprising the respective public transport vehicle is associated with a tagged radio node (e.g. also written in the respective dataset of the database).

When the radio node is detected to be installed to a bus, the information may be stored to a database for later/further use. The information can in particular be distributed to the other devices as a small downloadable database (e.g. as a file) and/or provided via an API. The mobile devices receiving the respective database information (e.g. mobile device 30) may be identical or different from the devices collecting the fingerprints (e.g. mobile device 40) and/or the mobile device using the original positioning service.

Accordingly, in action 57, the database or a part thereof may be provided to a respective mobile device (such as mobile device 30).

Figure 6:
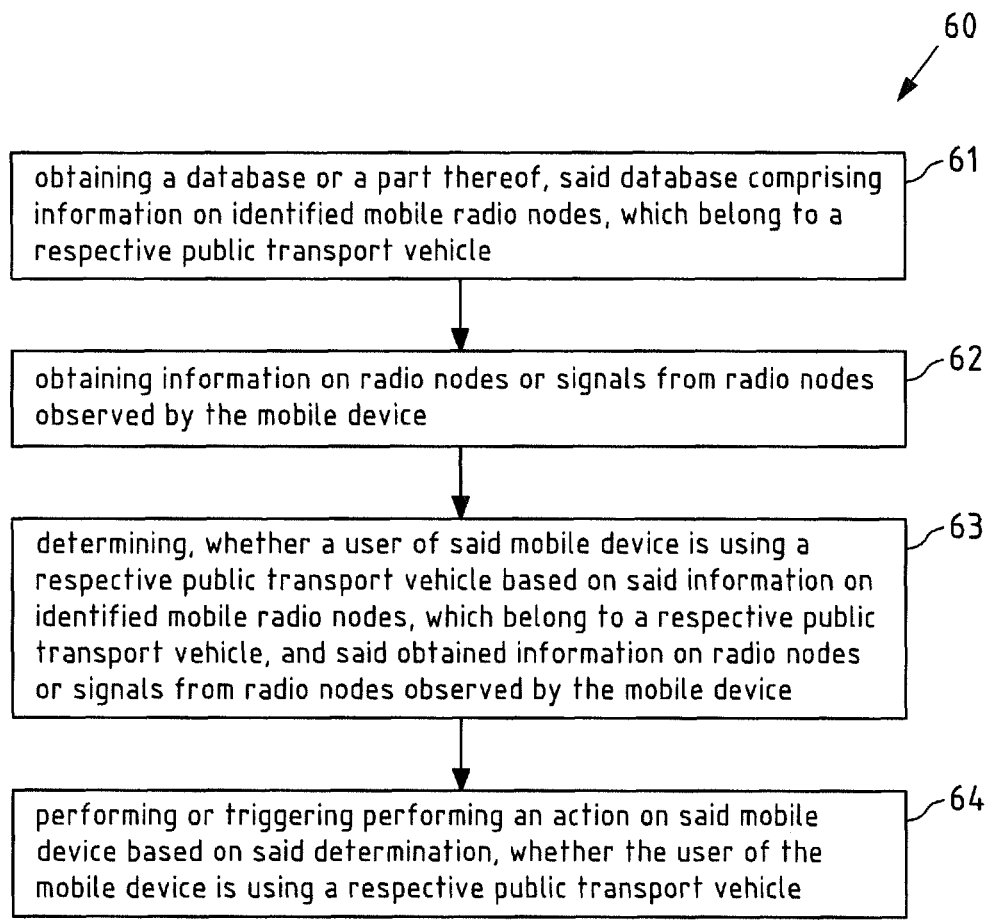
FIG. 6 is a flow chart illustrating an example of a method according to the second aspect.

FIG. 6 is a flow chart 60 illustrating an exemplary embodiment of a second method, which uses the database information described above to detect when a user is in a public transport vehicle and to then trigger advertisements. The actions of FIG. 6 may thus be referred to as triggering stage.

For this, the respective mobile device (e.g. mobile device 30), which may in particular be a consumer device, may run an application that can provide context-based advertisements. For instance, the application may be a free-of-charge application, whose monetization model is through advertisements. Now, the application may e.g. embed an advertisement SDK that is able to utilize the described wireless access point context information, as described below.

In action 61, a database or a part thereof is obtained, wherein said database comprises information on identified mobile radio nodes, which belong to a respective public transport vehicle. For instance, in the above described example, the SDK of the application may connect to the cloud server 20 to retrieve the wireless access point context database for e.g. the current city, e.g. over a wireless telecommunication network connection or over wireless access point 10.

In action 62, information on radio nodes or signals from radio nodes observed by the mobile device are obtained. For this, the described SDK may scan for the wireless access points in the surrounding of the mobile device 30 and, as mobile device is on board the bus 10, may inter alia observe signals from wireless access point 10 belonging to bus 10.

The combination of these two kinds of information allows, in action 63, to determine, whether a user of the mobile device is using a respective public transport vehicle. In above example, a respective determination may be made, when the SDK detects a match of the observed wireless access point 10 to the database (e.g. because the observed identifier of the wireless access point 10 and the identifier stored in the database match).

In action 64, an action on said mobile device is performed or triggered based on said determination, whether the user of the mobile device is using a respective public transport vehicle. An advertisement may be triggered in this specific case, because it can be inferred that the context is such that the user is prone to pay attention to the advertisement.

Even though a bus was used above as an example for a public transport vehicle, the same approach is applicable to other public transport vehicles such as trains or trams, for instance. For certain public transport vehicles, additional requirements may be used in order to detect the public transport context. For instance, determining a radio node of a taxi and discriminating it from a "normal" user using their mobile device as a hotspot in a car may require different or additional identification schemes, which have also been described above. For instance, an "unnatural" amount of movement within a certain time may be detected, as taxis are all the time on the move, while personal cars are not. Also, visits to taxi stands or stops may be utilized.

Figure 7:
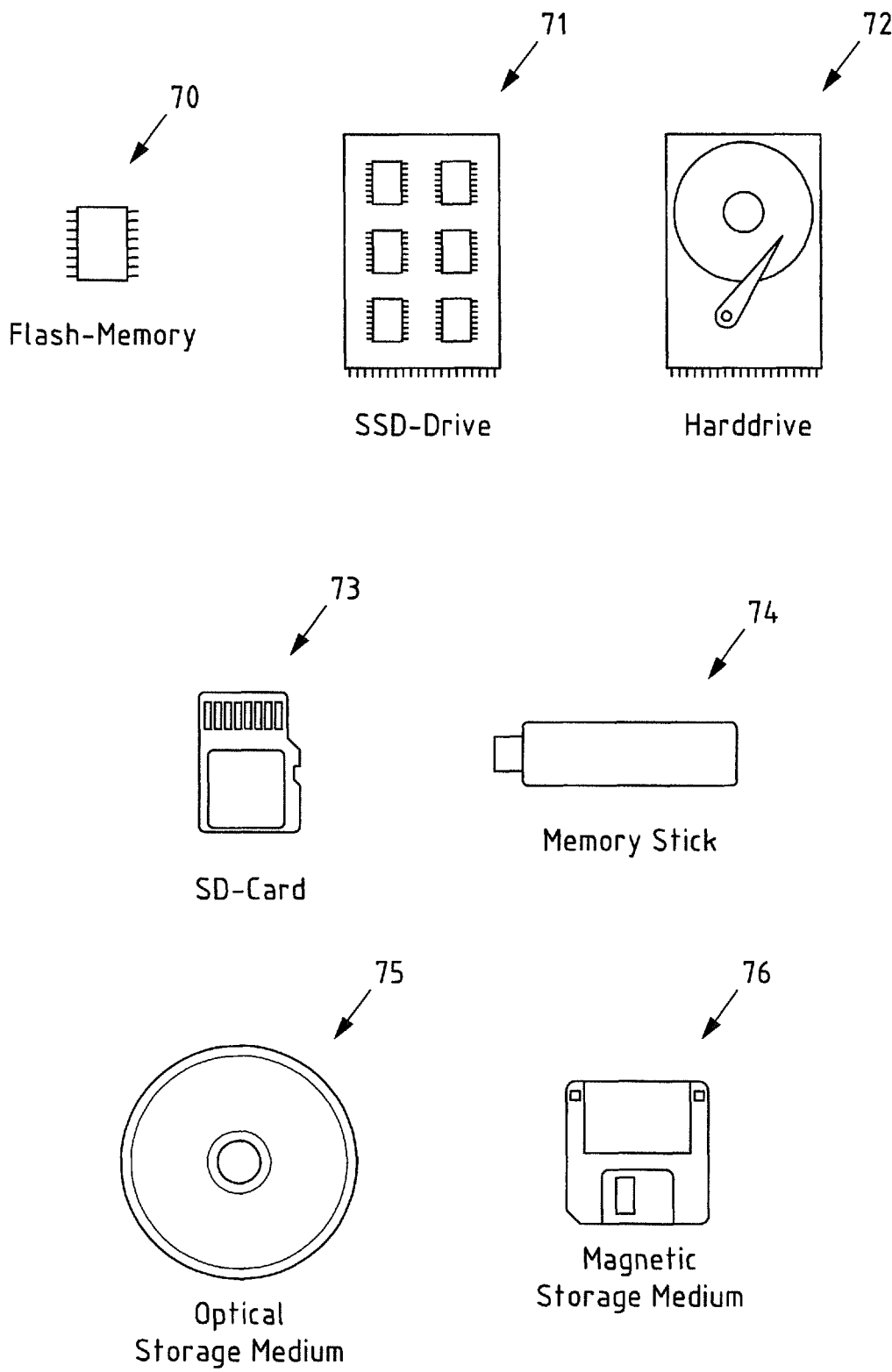
FIG. 7 is a schematic illustration of examples of tangible storage media according to the invention.

FIG. 7 is a schematic illustration of examples of tangible storage media according to the present invention, that may for instance be used to implement program memory 22 of FIG. 2 and/or program memory 32 of FIG. 3. To this end, FIG. 7 displays a flash memory 70, which may for instance be soldered or bonded to a printed circuit board, a solid-state drive 71 comprising a plurality of memory chips (e.g. Flash memory chips), a magnetic hard drive 72, a Secure Digital (SD) card 73, a Universal Serial Bus (USB) memory stick 74, an optical storage medium 75 (such as for instance a CD-ROM or DVD) and a magnetic storage medium 76.

The following embodiments are also disclosed:

1. A method, performed by at least one apparatus, the method comprising:
   obtaining a plurality of radio fingerprints, the radio fingerprints comprising information on radio nodes or signals from radio nodes observed by mobile devices and corresponding location estimates; and
   identifying, among said radio nodes, those radio nodes which are mobile radio nodes and which belong to a respective public transport vehicle, at least by relating movement information of a respective mobile radio node, said movement information being determined based on said obtained radio fingerprints, with public transport route information.

2. The method of embodiment 1, said method further comprising:
   tagging, in a database, said identified mobile radio nodes, which belong to a respective public transport vehicle.

3. The method of embodiment 1 or 2, said method further comprising:
   associating, in a database, said identified mobile radio nodes, which belong to a respective public transport vehicle, with respective supplemental public transport information related to said respective public transport vehicle or related to a public transport system comprising said respective public transport vehicle.

4. The method of any of embodiments 1 to 3, wherein said respective public transport vehicle is a motorized public transport vehicle and/or one of
   a bus;
   a rail vehicle;
   a taxi;
   a boat; and/or
   an aircraft.

5. The method of any of embodiments 1 to 4, wherein said identifying of those radio nodes, which are mobile radio nodes and which belong to a respective public transport vehicle, is at least in part based on a machine learning algorithm.

6. The method of any of embodiments 1 to 5, wherein said identifying of those radio nodes, which are mobile radio nodes and which belong to a respective public transport vehicle, comprises:

identifying, among said radio nodes, those radio nodes which are mobile radio nodes; and subsequently identifying, among said identified mobile radio nodes, those mobile radio nodes, which belong to a respective public transport vehicle.

7. The method of embodiment 6, wherein said identifying of those radio nodes, which are mobile radio nodes, comprises:

determining those radio nodes, the movement of which lies above a predetermined threshold.

8. The method of embodiment 7, wherein said predetermined threshold defines a minimum degree of movement with regard to space and/or time.

9. The method of any of embodiments 1 to 8, wherein said method further comprises:

utilizing real-time position information indicating a position of a respective public transport vehicle
  for identifying those radio nodes, which are mobile radio nodes and which belong to a respective public transport vehicle, and/or
  for verifying said identified mobile radio nodes, which belong to a respective public transport vehicle, and/or
  for determining supplemental public transport information related to said respective public transport vehicle or related to a public transport system comprising said respective public transport vehicle.

10. The method of embodiment 3, wherein said respective supplemental public transport information comprises one or more of
  information about or representative of a respective public transport vehicle;
  an identification of a respective public transport vehicle;
  information about or representative of a route of said respective public transport vehicle;
  an identification of a route of said respective public transport vehicle; and/or
  information about or representative of a public transport system comprising said respective public transport vehicle.

11. The method of any of embodiments 1 to 10, wherein said method further comprises:
  providing a database or a part thereof, said database at least comprising information on said identified mobile radio nodes, which belong to a respective public transport vehicle, and optionally further comprising respective supplemental public transport information associated with said respective identified mobile radio nodes, which belong to a respective public transport vehicle.

12. The method of any of embodiments 1 to 11, wherein said public transport route information at least comprises information on one or more of:
  a start point of a public transport route;
  an end point of a public transport route;
  a course of a public transport route or sections thereof;
  waypoints of a public transport route; and/or
  a stopover of a public transport route.

13. The method of any of embodiments 1 to 12, wherein said radio nodes are one or more of
  wireless access points;
  WiFi access points; and/or
  Bluetooth beacons.

14. A method, performed by at least one apparatus, said method comprising:

obtaining a database or a part thereof, said database comprising information on identified mobile radio nodes, which belong to a respective public transport vehicle;

obtaining information on radio nodes or signals from radio nodes observed by the mobile device;

determining, whether a user of said mobile device is using a respective public transport vehicle based on said information on identified mobile radio nodes, which belong to a respective public transport vehicle, and said obtained information on radio nodes or signals from radio nodes observed by the mobile device; and performing or triggering performing an action on said mobile device based on said determination, whether the user of the mobile device is using a respective public transport vehicle.

15. The method of embodiment 14, wherein said determining, whether a user of the mobile device is using a respective public transport vehicle is based on a comparison of said information on identified mobile radio nodes, which belong to a respective public transport vehicle, and said obtained information on radio nodes or signals from radio nodes observed by the mobile device.

16. The method of embodiment 14 or 15, wherein said action on said mobile device is a presentation of advertising.

17. An apparatus comprising at least one processor and at least one memory including computer program code, the at least one memory and the computer program code configured to, with the at least one processor, cause the apparatus at least to perform a method according to any of the embodiments 1 to 13.

18. An apparatus comprising means for performing a method according to any of the embodiments 1 to 13.

19. The apparatus according to embodiment 17 or 18, wherein the apparatus is or comprises:
  a module for a server; or
  a server.

20. An apparatus comprising at least one processor and at least one memory including computer program code, the at least one memory and the computer program code configured to, with the at least one processor, cause the apparatus at least to perform a method according to any of the embodiments 14 to 16.

21. An apparatus comprising means for performing a method according to any of the embodiments 14 to 16.

22. The apparatus according to embodiment 20 or 21, wherein the apparatus is or comprises:
  a module for a mobile device; or
  a mobile device.

23. System comprising:
  a first apparatus according to embodiment 17 or 18; and
  a second apparatus according to embodiment 20 or 21.

24. A computer program code, the computer program code, when executed by a processor, causing an apparatus to perform a method according to any of embodiments 1 to 16.

25. A computer readable storage medium in which computer program code is stored, the computer program code causing at least one apparatus to perform when executed by a processor a method according to any of embodiments 1 to 16.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors of FIGS. 2 and 3, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

That which is claimed is:

1. A method, performed by at least one apparatus, the method comprising:
    obtaining a plurality of radio fingerprints, the radio fingerprints comprising information on radio nodes or signals from radio nodes observed by mobile devices and corresponding location estimates;
    identifying, among said radio nodes, that one or more radio nodes which are mobile radio nodes belong to a respective public transport vehicle, at least by relating movement information of a respective mobile radio node with public transport route information or real-time position information associated with the respective public transport vehicle, wherein said movement information is determined based on said obtained radio fingerprints; and
    verifying that the one or more identified mobile radio nodes belong to the respective public transport vehicle based on the real-time position information provided by a real-time location system associated with the respective public transport vehicle.

2. The method of claim 1, said method further comprising:
    tagging, in a database, said identified one or more mobile radio nodes, which belong to a respective public transport vehicle.

3. The method of claim 1, said method further comprising:
    associating, in a database, said identified one or more mobile radio nodes, which belong to a respective public transport vehicle, with respective supplemental public transport information related to said respective public transport vehicle or related to a public transport system comprising said respective public transport vehicle.

4. The method of claim 1, wherein said respective public transport vehicle is a motorized public transport vehicle and/or one of
    a bus;
    a rail vehicle;
    a taxi;
    a boat; and/or
    an aircraft.

5. The method of claim 1, wherein said identifying of the one or more radio nodes, which are mobile radio nodes and which belong to a respective public transport vehicle, is at least in part based on a machine learning algorithm.

6. The method of claim 1, wherein said identifying of the one or more radio nodes, which are mobile radio nodes and which belong to a respective public transport vehicle, comprises:
    identifying, among said radio nodes, the one or more radio nodes which are mobile radio nodes; and
    subsequently identifying, among said identified one or more mobile radio nodes, the one or more mobile radio nodes, which belong to a respective public transport vehicle.

7. The method of claim 6, wherein said identifying of the one or more radio nodes, which are mobile radio nodes, comprises:
    determining the one or more radio nodes, the movement of which lies above a predetermined threshold.

8. The method of claim 7, wherein said predetermined threshold defines a minimum degree of movement with regard to space and/or time, and wherein the one or more radio nodes are identified as mobile radio nodes in response to moving for at least a minimum period of time.

9. The method of claim 1, wherein said method further comprises:
    utilizing the real-time position information indicating a position of a respective public transport vehicle
        for identifying the one or more radio nodes, which are mobile radio nodes and which belong to a respective public transport vehicle, and/or
        for determining supplemental public transport information related to said respective public transport vehicle or related to a public transport system comprising said respective public transport vehicle.

10. The method of claim 3, wherein said respective supplemental public transport information comprises one or more of
    information about or representative of a respective public transport vehicle;

an identification of a respective public transport vehicle;
information about or representative of a route of said respective public transport vehicle;
an identification of a route of said respective public transport vehicle; and/or
information about or representative of a public transport system comprising said respective public transport vehicle.

11. The method of claim 1, wherein said method further comprises:
providing a database or a part thereof, said database at least comprising information on said identified one or more mobile radio nodes, which belong to a respective public transport vehicle, and optionally further comprising respective supplemental public transport information associated with said respective identified one or more mobile radio nodes, which belong to a respective public transport vehicle.

12. The method of claim 1, wherein said public transport route information at least comprises information on one or more of:
a start point of a public transport route;
an end point of a public transport route;
a course of a public transport route or sections thereof;
waypoints of a public transport route; and/or
a stopover of a public transport route.

13. The method of claim 1, wherein said radio nodes are one or more of
wireless access points;
WiFi access points; and/or
Bluetooth beacons.

14. The method of claim 1, wherein identifying one or more radio nodes comprises identifying a radio node that belongs to a taxi based upon an unnatural amount of movement of the respective public transport vehicle within a certain time and/or a visit by the respective public transport vehicle to a taxi stand or stop.

15. An apparatus comprising at least one processor and at least one memory including computer program code, the at least one memory and the computer program code configured to, with the at least one processor, cause the apparatus at least to perform:
obtaining a plurality of radio fingerprints, the radio fingerprints comprising information on radio nodes or signals from radio nodes observed by mobile devices and corresponding location estimates;
identifying, among said radio nodes, that one or more radio nodes which are mobile radio nodes belong to a respective public transport vehicle, at least by relating movement information of a respective mobile radio node with public transport route information or real-time position information associated with the respective public transport vehicle, wherein said movement information is determined based on said obtained radio fingerprints; and
verifying that the one or more identified mobile radio nodes belong to the respective public transport vehicle based on the real-time position information provided by a real-time location system associated with the respective public transport vehicle.

16. The apparatus of claim 15, wherein the apparatus is or comprises:
a module for a server; or
a server.

17. System comprising:
a first apparatus comprising at least one processor and at least one memory including computer program code, the at least one memory and the computer program code configured to, with the at least one processor, cause the first apparatus at least to perform:
obtaining a plurality of radio fingerprints, the radio fingerprints comprising information on radio nodes or signals from radio nodes observed by mobile devices and corresponding location estimates;
identifying, among said radio nodes, that one or more radio nodes which are mobile radio nodes belong to a respective public transport vehicle, at least by relating movement information of a respective mobile radio node, said movement information being determined based on said obtained radio fingerprints, with public transport route information; and
verifying that the one or more mobile radio nodes that have been identified belong to the respective public transport vehicle based on real-time position information provided by a real-time location system of the respective public transport vehicle; and
a second apparatus comprising at least one processor and at least one memory including computer program code, the at least one memory and the computer program code configured to, with the at least one processor, cause the second apparatus at least to perform:
obtaining a database or a part thereof that has been generated by the first apparatus by downloading the database or the part thereof by a mobile device comprising the second apparatus, said database comprising information on the one or more identified mobile radio nodes, which belong to a respective public transport vehicle;
obtaining information on radio nodes or signals from radio nodes observed by the mobile device;
determining whether a user of said mobile device is using a respective public transport vehicle based on said information from the database that has been downloaded by the mobile device on the one or more identified mobile radio nodes, which belong to a respective public transport vehicle, and said obtained information on radio nodes or signals from radio nodes observed by the mobile device; and
performing or triggering performing an action on said mobile device based on said determination, whether the user of the mobile device is using a respective public transport vehicle.

* * * * *